Aug. 16, 1949.                W. G. LUNDQUIST                2,479,245
              INTERNAL-COMBUSTION ENGINE CRANKSHAFT AND GEARING
Filed June 26, 1944                                       3 Sheets-Sheet 1

INVENTOR.
WILTON G. LUNDQUIST.
BY
ATTORNEY

Aug. 16, 1949.   W. G. LUNDQUIST   2,479,245
INTERNAL-COMBUSTION ENGINE CRANKSHAFT AND GEARING
Filed June 26, 1944   3 Sheets-Sheet 2

INVENTOR.
WILTON G. LUNDQUIST.
BY
ATTORNEY

Aug. 16, 1949.  W. G. LUNDQUIST  2,479,245
INTERNAL-COMBUSTION ENGINE CRANKSHAFT AND GEARING
Filed June 26, 1944  3 Sheets-Sheet 3
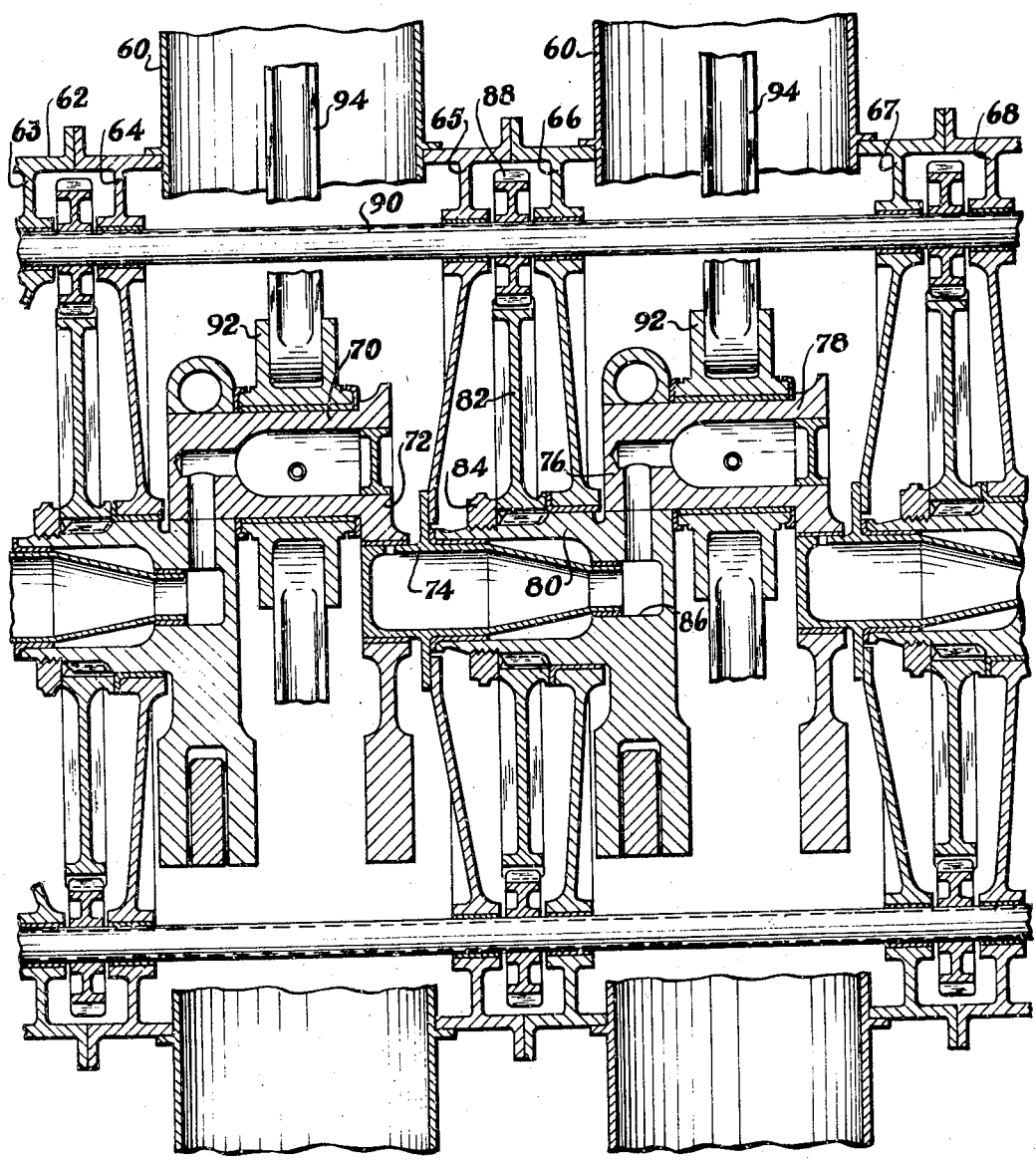
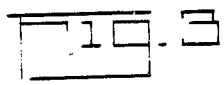
INVENTOR.
WILTON G. LUNDQUIST.
BY
ATTORNEY Patented Aug. 16, 1949

2,479,245

UNITED STATES PATENT OFFICE 2,479,245

INTERNAL-COMBUSTION ENGINE
CRANKSHAFT AND GEARING

Wilton G. Lundquist, Hohokus, N. J., assignor to
Wright Aeronautical Corporation, a corporation of New York Application June 26, 1944, Serial No. 542,165

1 Claim. (Cl. 74—389)

This invention relates to internal combustion engines, and is particularly directed to improvements in the crank shaft construction and in the propeller drive connected thereto. The invention is described in connection with an internal combustion engine of the radial cylinder type, however, the invention is not so limited, but is of general application.

In the conventional crank shaft of an internal combustion engine, the crank shaft bearings are axially offset relative to the planes of the crank cheeks, whereupon the crank cheeks are subjected to bending moments during engine operation because of this offset. It is an object of this invention to so modify the crank shaft construction that at least one crank cheek of each crank pin is supported by a bearing disposed in the plane of rotation of the crank cheeks in order to minimize such bending moments. This arrangement eliminates the bending moment in the crank cheek in any plane parallel to the crankshaft axis, except that introduced by bending of the crank pin, and as a result, the crank cheek is principally subjected only to bending moments in its plane of rotation. Therefore, the crank cheek can be made relatively light with a resulting reduction in weight. Furthermore, by providing a plurality of individual crank shafts each transmitting its power to one or more propeller shafts independently of the other crank shafts, instead of a single integral crank shaft for transmitting the entire engine power, it is possible to reduce the otherwise necessary size and weight of the crank shaft.

Other objects of this invention will become apparent upon reading the annexed detailed description in connection with the drawing in which:

Figure 3 is an axial sectional view similar to Figure 1 but of a modification.

Figure 1:
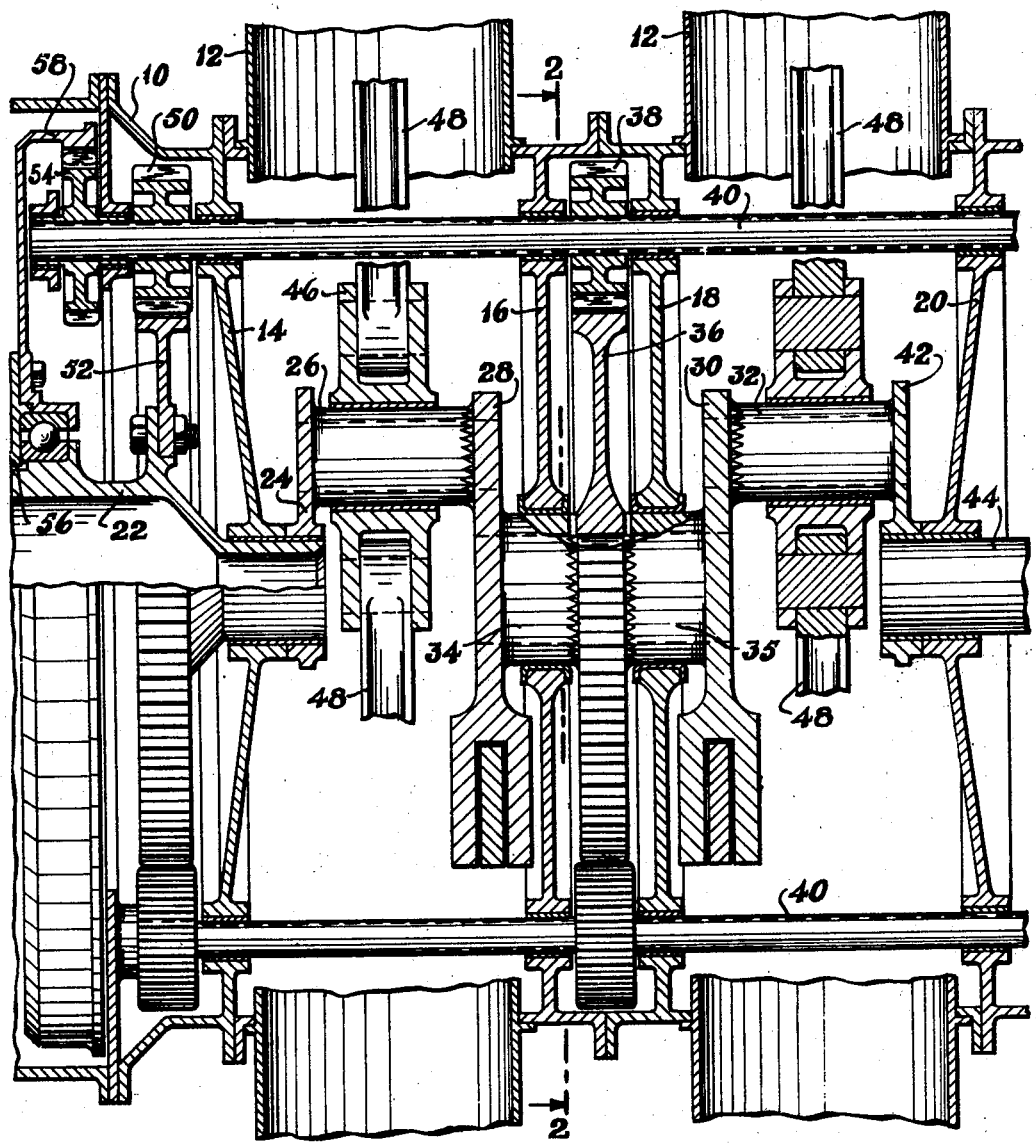
Figure 1 is an axial section through one embodiment of the invention.
Figure 2:
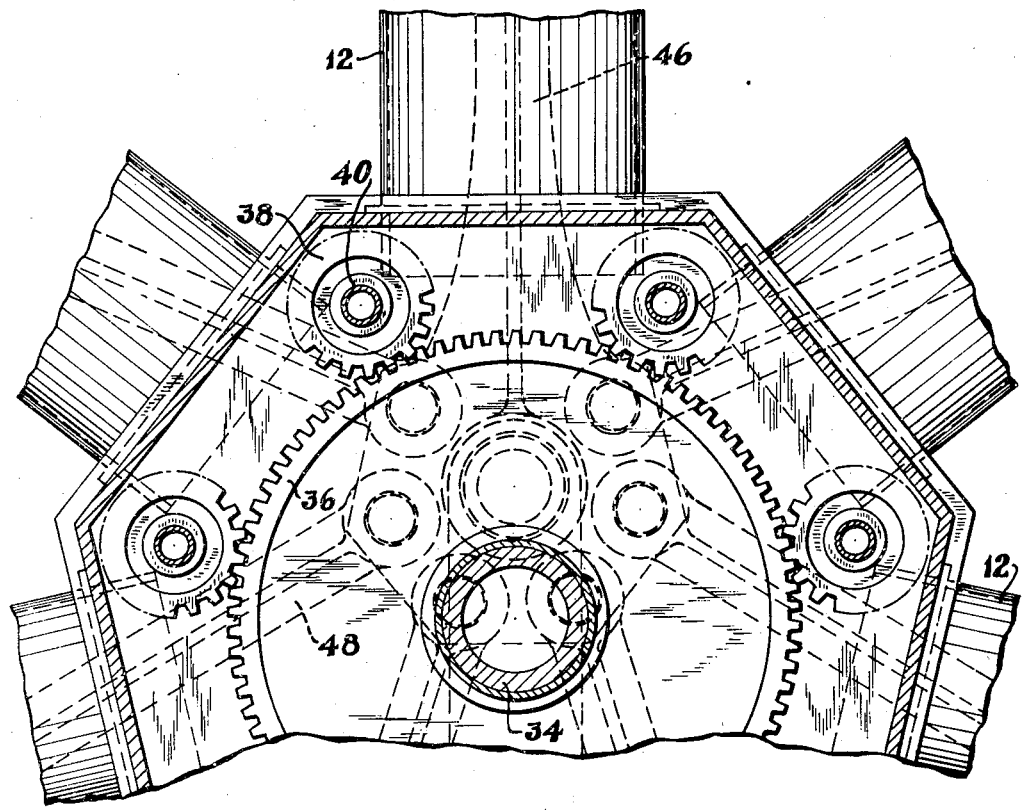
Figure 2 is a sectional view taken along line 2—2 of Figure 1.

Referring to Figures 1 and 2 of the drawing, a radial cylinder engine is provided with a sectional tubular crank case 10 about which the radially disposed cylinders 12 are mounted. As illustrated, two banks of radially disposed cylinders 12 are mounted about the crank case and an integral double throw crank shaft serves these two banks of cylinders. The cylinders of each bank are disposed in tandem relation, thereby defining a plurality of in-line cylinder rows circumferentially spaced about a common axis.

The crank case 10 as illustrated is provided with transverse supporting webs 14, 16, 18 and 20. The web 14 provides a bearing support for the member 22 which in this case is one of the propeller shafts. An axial extension of the propeller shaft 22 provides bearing support for the crank cheek 24 of the crank pin 26 directly in the plane of rotation of this crank cheek. A clamp joint is provided between the crank cheek 28 and the crank pin 26 which are provided with mating serrations and are bolted together; however, a conventional split clamp joint of the type illustrated in Figure 3 could readily be substituted for this conventional serrated-type clamp joint. The crank cheek 28 and the adjacent crank cheek 30 of the second crank pin 32 are each provided with axial bearing bosses 34 and 35 journaled within the crank shaft supporting webs 16 and 18 respectively. A drive gear 36 is interposed between the bearing bosses 34 and 35 and is clamped thereto by a serrated-type clamp joint. The drive gear 36 transmits its load to a plurality of circumferentially spaced pinions 38, carried by lay shafts 40. Each of the lay shafts 40 is supported within the crank case by the crank case supporting webs between the in-line rows of the radially disposed cylinders with their pinions 38 disposed between adjacent banks of cylinders. The relative position of the lay shafts 40 between the in-line cylinder rows is best seen in Figure 2. The other crank cheek 42 of the crank pin 32 is similar to the crank cheek 24 in that it is provided with a bearing support about the central shaft-like member 44 in its plane of rotation, the member 44 in turn being supported by the crank case web 20. A master connecting rod 46 is journaled about each crank pin and a plurality of auxiliary connecting rods 48 are articulated thereto.

The engine may also comprise third and fourth banks of radially disposed cylinders with a second double throw crank shaft serving these third and fourth cylinder banks said second double throw crankshaft being like the crankshaft serving the two banks of cylinders 12 and being similarly connected to the layshafts 40. With this arrangement, each double throw crank shaft transmits its power to the lay shafts 40 independently of the other crank shaft, thereby reducing the necessary size and strength of the crank shaft construction required as compared to a single integral crank shaft construction in which all the power is transmitted through the single crank shaft.

With the present construction, each end crank cheek of a double throw crank shaft is provided with a bearing support in its plane of rotation whereby one crank cheek of each crank pin is so supported. Also, a single drive gear 36 for each double throw crank shaft is disposed between its two crank pins and each of the gears 36 transmits the load of its associated crank shaft to a plurality of circumferentially spaced lay shafts 40 independently of the other double throw crank shafts.

The lay shafts 40 extend forwardly and each carries a pinion 50 drivably connected to an external gear 52 on the propeller shaft 22. In addition, the forward ends of each of the lay shafts 40 are provided with a pinion 54 drivably connected to an internal gear 58 of a co-axial propeller shaft 56 for reversely driving this propeller shaft. With this arrangement, a dual-rotation propeller drive is provided in which a plurality of crank shafts independently transmit power to a plurality of lay shafts and from which the power is transmitted directly to a pair of oppositely rotating propeller shafts without first transmitting the power from the lay shafts to a common central member.

With the modification of Figure 1, there is one driving gear 36 for each pair of crank throws. In the modification of Figure 3, a driving gear is provided for each crank throw, and in addition, split clamp joints have been substituted for the serrated-type clamp joints of Figure 1.

Referring now to the modification of Figure 3, a plurality of banks of radially disposed cylinders 60 are mounted about the sectional tubular crank case 62. The crank case is provided with a plurality of transverse supporting webs 63, 64, 65, 66, 67 and 68, as illustrated in the drawing, for supporting the crank shafts and the lay shafts driven thereby.

Two identical individual crank shafts are illustrated in Figure 3, each with a single crank pin. Considering the left hand crank shaft as seen in the drawing, the crank pin 70 is formed integral with its right hand crank cheek 72 which is journaled about a fixed central shaft-like member 74. The shaft-like member 74 is provided with a cantilever-type support by the crank case web 65. The left hand crank cheek 76 of the adjacent crank pin 78 is secured to the crank pin 78 by a conventional split clamp joint and is provided with a boss 80 axially projecting therefrom. The crank cheek boss 80 is journaled within the crank case supporting web 66, and in addition, is piloted about the central supporting member 74 adjacent the crank case supporting web 65. Intermediate the two crank case supporting webs 65 and 66, a driving gear 82 is splined to the boss 80 and is held in position by a nut 84. The shaft-like member 74 also extends to the right from its supporting web 65 and is piloted within a bore 86 within the crank cheek 76 in order to add to the rigidity of the member 74. This latter construction has the disadvantage in that there would then be no relative rotation between the crank cheek 72 and its bearing support.

The remaining left and right hand crank cheeks illustrated in Figure 3 are similar to the crank cheeks 76 and 72 respectively, and each crank pin is drivably connected to an individual driving gear 82 independently of the other crank pins. That is, each crank pin load is transmitted directly to the associated gear 82 and is not transmitted through any of the other crank pins. Each driving gear 82 drivably engages a plurality of circumferentially spaced pinions 88 carried by the lay shafts 90. The lay shafts 90 are similar to the lay shafts 40 of Figure 1 and may be drivably connected to a pair of co-axial propeller shafts in a manner similar to that illustrated in Figure 1. Also, as illustrated in Figure 1, a master connecting rod 92 is journaled about each crank pin and a plurality of auxiliary connecting rods 94 are articulated thereto.

In both modifications illustrated, one crank cheek of each crank pin is supported by a bearing disposed within the plane of rotation of the crank cheek instead of by a bearing axially offset from its plane of rotation. Accordingly, with the construction of either modification, the usual bending stresses existing in these crank cheeks, due to bending moments in planes parallel to the crank shaft axis, are eliminated, thereby making it possible to reduce the size and weight of these crank cheeks.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications and changes.

I claim as my invention:

In an engine, first and second co-axially spaced crank shafts each adapted to transmit its power to one or more shafts independently of the other crank shaft, a support axially disposed between said first and second crank shafts and about which the crank cheek at the adjacent end of said first crank shaft is journaled in its plane of rotation, the other end of said first crank shaft being drivably connected to said one or more shafts, the crank cheek at the adjacent end of said second crank shaft having an axial extension surrounding said support and being drivably connected to said one or more shafts, the crank cheek at the other end of said second crank shaft having a bearing support in its plane of rotation.

WILTON G. LUNDQUIST.

REFERENCES CITED

The following references are of record in the file of this patent:

UNITED STATES PATENTS

| Number | Name | Date |
|--------|------|------|
| 1,354,535 | Coffman | Oct. 5, 1920 |
| 1,420,905 | Bailey | June 7, 1922 |
| 1,552,215 | Chase | Sept. 1, 1925 |
| 1,567,986 | Ricardo | Dec. 29, 1925 |
| 2,062,293 | Cashman | Dec. 1, 1936 |
| 2,119,104 | Hirth | May 31, 1938 |
| 2,297,214 | Gosslau | Sept. 29, 1942 |
| 2,366,852 | Goodman | Jan. 9, 1945 |

FOREIGN PATENTS

| Number | Country | Date |
|--------|---------|------|
| 20,764 | France | Feb. 8, 1919 |
| 78,988 | Switzerland | Jan. 5, 1918 |